US012384275B2

(12) United States Patent
Geddadi et al.

(10) Patent No.: US 12,384,275 B2
(45) Date of Patent: Aug. 12, 2025

(54) BATTERY CHARGING SYSTEM FOR A HYBRID ELECTRIC VEHICLE (71) Applicant: TVS MOTOR COMPANY LIMITED, Chennai (IN)

(72) Inventors: Krishnamohan Geddadi, Chennai (IN); Surajit Das, Chennai (IN); Samraj Jabez Dhinagar, Chennai (IN)

(73) Assignee: TVS MOTOR COMPANY LIMITED, Chennai (IN)

(*) Notice: Subject to any disclaimer, the term of this patent is extended or adjusted under 35 U.S.C. 154(b) by 475 days.

(21) Appl. No.: 17/436,487

(22) PCT Filed: Mar. 7, 2020

(86) PCT No.: PCT/IN2020/050213
§ 371 (c)(1),
(2) Date: Sep. 3, 2021

(87) PCT Pub. No.: WO2020/188590
PCT Pub. Date: Sep. 24, 2020

(65) Prior Publication Data
US 2022/0185144 A1    Jun. 16, 2022

(30) Foreign Application Priority Data
Mar. 18, 2019  (IN) .............................. 201941010471

(51) Int. Cl.
*B60L 58/13*    (2019.01)
*B60L 50/51*    (2019.01)
(Continued)

(52) U.S. Cl.
CPC .............. *B60L 58/13* (2019.02); *B60L 50/51* (2019.02); *H02J 7/0048* (2020.01);
(Continued)

(58) Field of Classification Search
CPC .......... B60L 3/12; B60L 7/18; B60L 15/2009; B60L 15/2045; B60L 50/16; B60L 50/51;
(Continued)

(56) References Cited

U.S. PATENT DOCUMENTS 5,264,764 A * 11/1993 Kuang ................ B60L 15/2045
180/65.245
2010/0102626 A1 * 4/2010 Tachibana ................. H02J 1/08
307/9.1
(Continued)

FOREIGN PATENT DOCUMENTS

EP    2413420 B1    11/2018

OTHER PUBLICATIONS

International Search Report issued in corresponding International Patent Application No. PCT/IN2020/050213 dated Jul. 10, 2020 (3 pages).
(Continued)

*Primary Examiner* — Peter D Nolan
*Assistant Examiner* — Ce Li Li
(74) *Attorney, Agent, or Firm* — Osha Bergman Watanabe & Burton LLP (57) ABSTRACT

A battery charging system for a hybrid electric vehicle includes: a battery, a battery management system, and a support unit. The support unit includes an electronic control unit provided with a predefined motor speed constant (S) and a predefined state of charge value (SoC). The electronic control unit receives a real-time motor speed (SRT) from one or more sensing units and a real-time state of charge value (SoCRT) for the battery from the battery management system. The electronic control unit generates one of a first activation signal and a second activation signal based on one of the real-time motor speed (SRT) and the real-time state of charge value (SoCRT) of the battery. The battery manage-
(Continued)

ment system initiates a voltage source inverter charging mode upon generation of the first activation signal and a boost converter charging mode upon generation of the second activation signal.

5 Claims, 8 Drawing Sheets (51) Int. Cl.
  *H02J 7/00* (2006.01)
  *H02J 7/14* (2006.01)
(52) U.S. Cl.
  CPC ......... *H02J 7/1446* (2013.01); *B60L 2200/12* (2013.01); *B60L 2210/14* (2013.01); *B60L 2210/42* (2013.01); *B60L 2240/421* (2013.01); *H02J 2310/48* (2020.01)
(58) Field of Classification Search
  CPC .......... B60L 50/61; B60L 58/12; B60L 58/13; B60L 58/14; B60L 58/15; B60L 2200/12; B60L 2210/14; B60L 2210/42; B60L 2240/421; B60L 2240/445; B60T 1/10; B60T 8/172; B60T 8/52; B60T 2270/604; B60W 2510/0676; B60W 2510/244; H02J 7/00304; H02J 7/00306; H02J 7/0048; H02J 7/143; H02J 7/1446; H02J 7/1492; H02J 2310/48; Y02T 10/62; Y02T 10/64; Y02T 10/70; Y02T 10/7072; Y02T 10/72; Y02T 10/92
  See application file for complete search history.

(56) References Cited

U.S. PATENT DOCUMENTS

2016/0001659 A1* 1/2016 Huh .................... B60L 15/2009
                                                                  701/70
2021/0194262 A1* 6/2021 Ogura .................... H02J 3/466

OTHER PUBLICATIONS

Written Opinion issued in corresponding International Patent Application No. PCT/IN2020/050213 dated Jul. 10, 2020 (6 pages).

* cited by examiner

BATTERY CHARGING SYSTEM FOR A HYBRID ELECTRIC VEHICLE

TECHNICAL FIELD

The present subject matter, in general, relates to a hybrid electric vehicle, and, in particular relates to a battery charging system for the hybrid electric wheeled vehicle.

BACKGROUND

In the last few decades, automobile industry has shown a remarkable growth and development, in terms of technology as well as sales. Due to consistent advancement in technology, vehicles, such as bicycles, motorcycles, scooters and lightweight scooters, have succeeded in maintaining their popularity among different sections of society. Different sections of society, based on their requirement, utilize the vehicles for various purposes, such as a recreational activity, a means of transportation, and for sports activities. As a result, it becomes pertinent for the automobile industry to constantly develop and modify the components of the vehicles to suit requirements of different riders.

In accordance with the same ideology, various types of traction mechanisms for the vehicles are developed. For example, hybrid electric vehicles have two traction mechanisms involved, which includes an internal combustion engine based traction mechanism, and an electric motor based traction mechanism. Conventionally, the electric motor for the hybrid electric vehicles is powered by a battery installed within the hybrid electric vehicles. Generally, the battery is charged by an external source through a charging plug available in the hybrid electric vehicle or by a voltage source inverter provided in the hybrid electric vehicle. The voltage source inverter charges the battery in certain required conditions such as during braking, or low battery state of charge (hereinafter SOC) condition.

Generally, the voltage source inverter can only charge the battery within a predefined motor speed range and the external source through the charging plug can only charge with a minimum available voltage in the battery. If the motor speed is higher than the predefined vehicle-speed range than the voltage source inverter gets disconnected from the battery in order to avoid any battery damage during the internal combustion engine based traction. Additionally, if the battery is in deep-discharge condition then the provided charging plug cannot charge the battery through the external power source. In this case, the user has to use a specific charging mechanism that is only available at selected locations such as vehicle service stations and the vehicle dealer locations. This creates discomfort and extra effort for the user of the hybrid electric vehicle.

Thus, there is a requirement of a system that can address the aforementioned and other problems stated above.

SUMMARY

The present subject matter provides a hybrid electric vehicle with a battery charging system. The battery charging system of the hybrid electric vehicle includes a battery, a battery management system, and a support unit.

It is a feature of the present subject matter that the battery is directly connected to the battery management system. The support unit is connected to the battery through the battery management system. The support unit is powered by the battery and the back emf (electromotive force) of the motor. Additionally, a rectifier and regulator unit that is connected to a magneto of the hybrid electric vehicle also powers the support unit.

It is yet another feature of the present subject matter that the support unit includes an electronic control unit, a voltage source inverter, and a boost converter. The electronic control unit is communicably connected to the battery management system and is provided with a predefined motor speed constant S, and a predefined state of charge value for the battery. Additionally, the electronic control unit receive a real-time motor speed $S_{RT}$ using one or more sensing units, and a real-time state of charge value for the battery from the battery management system;

It is a feature of the present subject matter that the predefined motor speed constant is a fixed value for any motor and is a function of a speed of the motor and a back electromotive force voltage generated at that speed. The predefined motor speed constant defines a motor speed band that includes a higher band value and a lower band value. The higher band value defines a top speed of the motor and lower band value defines a pre-idling speed of the hybrid electric vehicle.

It is another feature of the present subject matter that the predefined state of charge value defines a predefined minimum state of charge value, and a predefined maximum state of charge value for the battery.

It is a feature of the present subject matter that the voltage source inverter is communicably connected to the electronic control unit, the battery management system, and the motor. The voltage source inverter is also connected to the battery management system through a first switch.

It is yet another feature of the present subject matter that the boost convertor is communicably connected to the electronic control unit and the battery management system. In addition, the boost convertor is connected to and powered by the rectifier and regulator unit.

An objective of the present subject matter is that the electronic control unit receives a real-time motor speed and a real-time state of charge value of the battery and generates either a first activation signal or a second activation signal based on one of the real-time motor speed and the real-time state of charge value of the battery.

It is yet another objective of the present subject matter, that the battery management system initiates a voltage source inverter charging mode upon generation of the first activation signal. Similarly, the battery management system initiates a boost converter charging mode upon generation of the second activation signal.

An objective of the present subject matter is that the electronic control unit generates the first activation signal if the real-time state of charge value of the battery is more than the predefined minimum state of charge value. Additionally, the electronic control unit generates the first activation signal if the real-time motor speed lies between the higher band value and the lower band value.

It is yet another objective of the present subject matter that the electronic control unit generates the second activation signal if the real-time state of charge value of the battery is less than the predefined minimum state of charge value. Additionally, the electronic control unit generates the second activation signal if the real-time motor speed is more than the higher band value. The electronic control unit also generates the second activation signal if the real-time motor speed is less than the lower band value.

It is another objective of the present subject matter that the electronic control unit disables the battery management system to deactivate a boost converter charging mode and a voltage source inverter charging mode (hereinafter VSI charging mode), if the real-time state of charge value of the battery is more than the predefined maximum state-of-charge value.

It is an important feature of the present subject matter to enable the uninterrupted charging of the battery in various motor speed bands. For example, the battery is charged through the voltage source inverter within specified band value i.e. between the lower band value and the higher band value. Above this higher band value, the voltage source inverter fails to charge the battery as the battery management system is disconnected due to very high voltage levels generated on high motor speeds. Thus, it is an advantage of the present subject matter that the boost converter provides input to the battery management system to enable the battery charging above the higher band value during high speed of vehicle.

It is an important feature of the present subject matter that the boost converter charges the battery when the battery is below the predefined state of charge value. Thus, it is an advantage of the present subject matter that the user can charge the battery in even a deep-discharge condition and need not to take the vehicle to any specific location to solve the issue. Thus, the present subject matter provides usability and comfort to the vehicle user.

It is yet another important feature of the present subject matter that the boost converter charges the battery when the real-time motor speed is less than the lower band value i.e. when the vehicle reaches a pre-idling motor speed. It is an advantage of the invention that during braking and standstill conditions, the battery is charged by the boost converter using the standstill engine energy. This leads to a better fuel and battery efficiency for the hybrid electric vehicle.

Summary provided above explains the basic features of the invention and does not limit the scope of the invention. The nature and further characteristic features of the present invention will be made clearer from the following descriptions made with reference to the accompanying drawings.

BRIEF DESCRIPTION OF THE DRAWINGS

The detailed description is provided with reference to the accompanying figures. The same reference numbers are used throughout the drawings to reference like features and components.

FIG. 5 (FIG. 5A and FIG. 5B) depicts a flow chart describing enablement of the battery charging system describing the present subject matter, in accordance with the embodiment depicted in FIG. 4.

DETAILED DESCRIPTION

Figure 1:
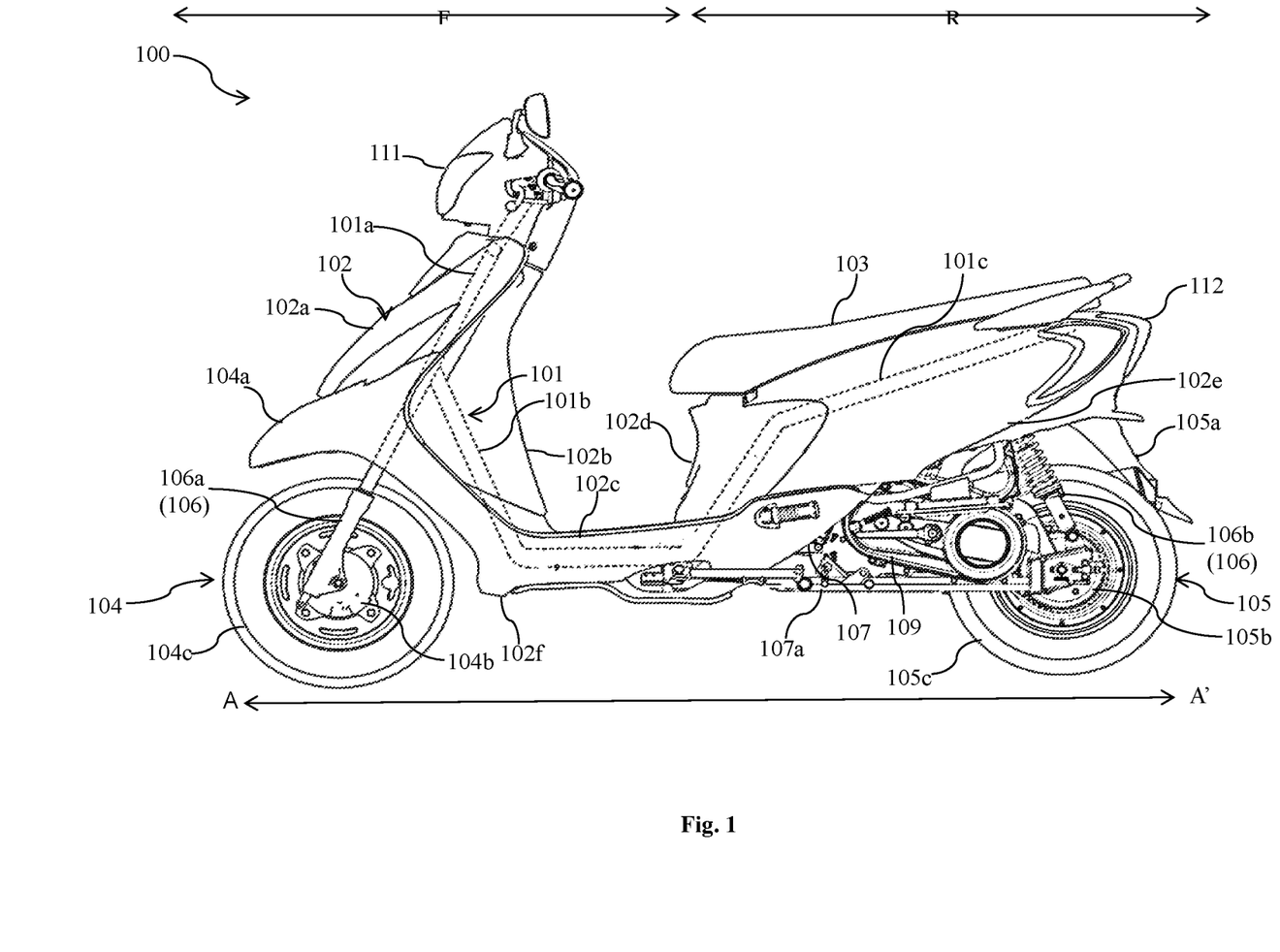
FIG. 1 illustrates a conventional two wheeled hybrid electric vehicle, in accordance with an embodiment of the present subject matter.

The present subject matter provides an exemplary hybrid electric two-wheeled vehicle (hereinafter 'vehicle') (100) as shown in FIG. 1. The described vehicle (100) typically includes a low-framework structure (hereinafter 'frame') (101), a plurality of body panels (102), a seat assembly (103), a utility box (not shown), a front wheel (104), a rear wheel (105), a plurality of suspension units (106), an internal combustion engine (hereinafter 'engine') (107), a hub-type electric motor (hereinafter 'motor') (108) (shown in FIG. 2), a transmission system (109), a plurality of electrical and electronic components, and a battery (110) (shown in FIG. 2).

The frame (101) includes a head tube (101*a*), a main tube (101*b*), and a pair of side frames (101*c*). The main tube (101*b*) extends downwards from an anterior portion of the head tube (101*a*) and then extends rearwards in an inclined manner. The pair of side tubes (101*c*) extends inclinedly upwards from the main tube (101*b*), in rearward direction of the vehicle (100). Thus, the frame (101) extends from a front portion (F) to a rear portion (R) of the vehicle (100), along a vehicle longitudinal direction (AA').

The plurality of body panels (102) covers multiple portions of the frame (101). The plurality of body panels (102) includes a front panel (102*a*), a leg shield (102*b*), a floorboard (102*c*), an under-seat cover (102*d*), a left-side panel (102*e*), a right-side panel (not shown), a left-side trim cover (102*f*), and a right-side trim cover (not shown). The front panel (102*a*) and the leg shield (102*b*) cover the front portion of the frame (101), particularly by covering the head tube (101*a*) and the front portion of the main tube (101*b*). The floorboard (102*c*), the under-seat cover (102*d*), the left-side trim cover (102*f*), and the right-side trim cover (not shown) shield the center portion of the frame (101), particularly by covering the center and rear part of the main tube (101*b*). Similarly, the left-side panel (102*e*) and the right-side panel (not shown) cover the rear end of the frame (101), particularly by covering the pair of side tubes (101*c*).

The seat assembly (103) is disposed above the under-seat cover (102*d*) and between the left-side panel (102*e*) and the right-side panel (not shown). The seat assembly (103) is pivotally mounted to the top portion of the under-seat cover (102*d*). The utility box (not shown) is disposed below the seat assembly (103). The utility box (not shown) can be accessed by opening the seat assembly (103).

The front wheel (104) is disposed in the front portion F of the vehicle (100), under a front fender (104*a*). The front fender (104*a*) is further disposed below the front cover (102*a*) and the leg shield (102*b*). The front fender (104*a*) covers at least a portion of the front wheel (104). The front wheel (104) includes a front hub (104*b*) and a front tire (104*c*), removably attached with each other.

The rear wheel (105) is disposed at the rear portion R of the vehicle (100) under a rear fender (105*a*). The rear fender (105*a*) is further disposed below and between the left side panel 102*d* and the right side panel (not shown). The rear fender (105*a*) covers at least a portion of the rear wheel (105). The rear wheel (105) includes a rear hub (105*b*) and a rear tire (105*c*), removably attached with each other.

The plurality of suspension units (106) includes a front suspension unit (106a) and a rear suspension unit (106b). The front suspension unit (106a) connects the front wheel (104) to the front portion of the frame (101) through the front hub (104b). The rear suspension unit (106b) connects the rear wheel (105) to the rear portion of the frame (101) through the rear hub (105b). The front and rear suspension unit (106a, 106b) may include one or more suspension units. For example, the front suspension unit (106a) may include a left front suspension unit and a right front suspension unit. Similarly, the rear suspension unit (106b) may include a left-rear suspension unit and a right-rear suspension unit.

The engine (107) is disposed behind the floorboard (102c) and the under-seat cover (102d) and is supported between the pair of side tubes (101c). The engine (107) is disposed on a swing arm (107a) through one or more mounting bosses (not shown) being attached therein. A front end of the swing arm (107a) is attached to the rear portion of the main tube (101b) and a rear end of the swing arm (107a) is attached to the rear wheel (105). The engine 107 generates fuel combustion induced power that is to be transferred to the rear wheel 105 during engine-based propulsion of the vehicle (100).

The motor (108) (shown in FIG. 2) is mounted on the rear hub (105b) of the rear wheel (105) through a motor sprocket (not shown). The motor (108) generates electric power that is to be transferred to the rear wheel (105) during motor-based propulsion of the vehicle (100).

The transmission system (109) is a power transfer system of the vehicle (100) that transmits power either from the engine (107) to the rear wheel (105) or from motor (108) to the rear wheel (105), based on propulsion mode of the vehicle (100). In a hybrid type setup, the vehicle (100) may have multiple propulsion modes such as propulsion by the engine (107) alone, propulsion by the motor (108) alone, and propulsion by both the engine (107) and the motor (108) simultaneously.

Generally, the vehicle (100) includes four operating modes. The four operating modes of the vehicle (100) include a sole engine mode, a sole motor mode, a hybrid power mode, and a hybrid economy mode. In sole engine mode the engine (107) alone powers the vehicle (100), and in the sole motor mode the motor (108) alone powers the vehicle (100). In the hybrid power mode the engine (107) as well as the motor (108) together power the vehicle (100) and in the hybrid economy mode the motor (108) powers the vehicle (100) to start the traction, followed by the engine (107) and motor (108) powering the vehicle (100) for transitive traction, before being powered only by engine (107). While starting the vehicle (100), more particularly at zero speed of the vehicle (100), a rider may select any of the operating modes with the help of a mode switch (not shown). Based on the selection of the rider, the transmission system (109) accordingly transmits power to the rear wheel (105).

The plurality of electrical and electronic components is installed on various places in the vehicle (100). The plurality of electrical and electronic components may include one or more electrical loads EL and one or more electronic loads ECL. The electrical loads EL may include the motor (108), a headlamp (111), a tail lamp (112), a transistor controlled ignition (TCI) unit (not shown), a starter motor (not shown), and the like. The electronic loads ECL may include a touch screen LCD unit (not shown), a micro controller unit MCU (not shown), a hydraulic control unit (not shown), and the like.

The battery (110) (shown in FIG. 2) supplies power to the plurality of electrical and electronic components and gets charged using the back e. m. f. generated by the motor (108). The present subject matter is further described in detail, in view of FIG. 2 to FIG. 9, describing an existing charging system along with the drawbacks, and a new charging system with its advantages over the existing drawbacks.

Figure 2:
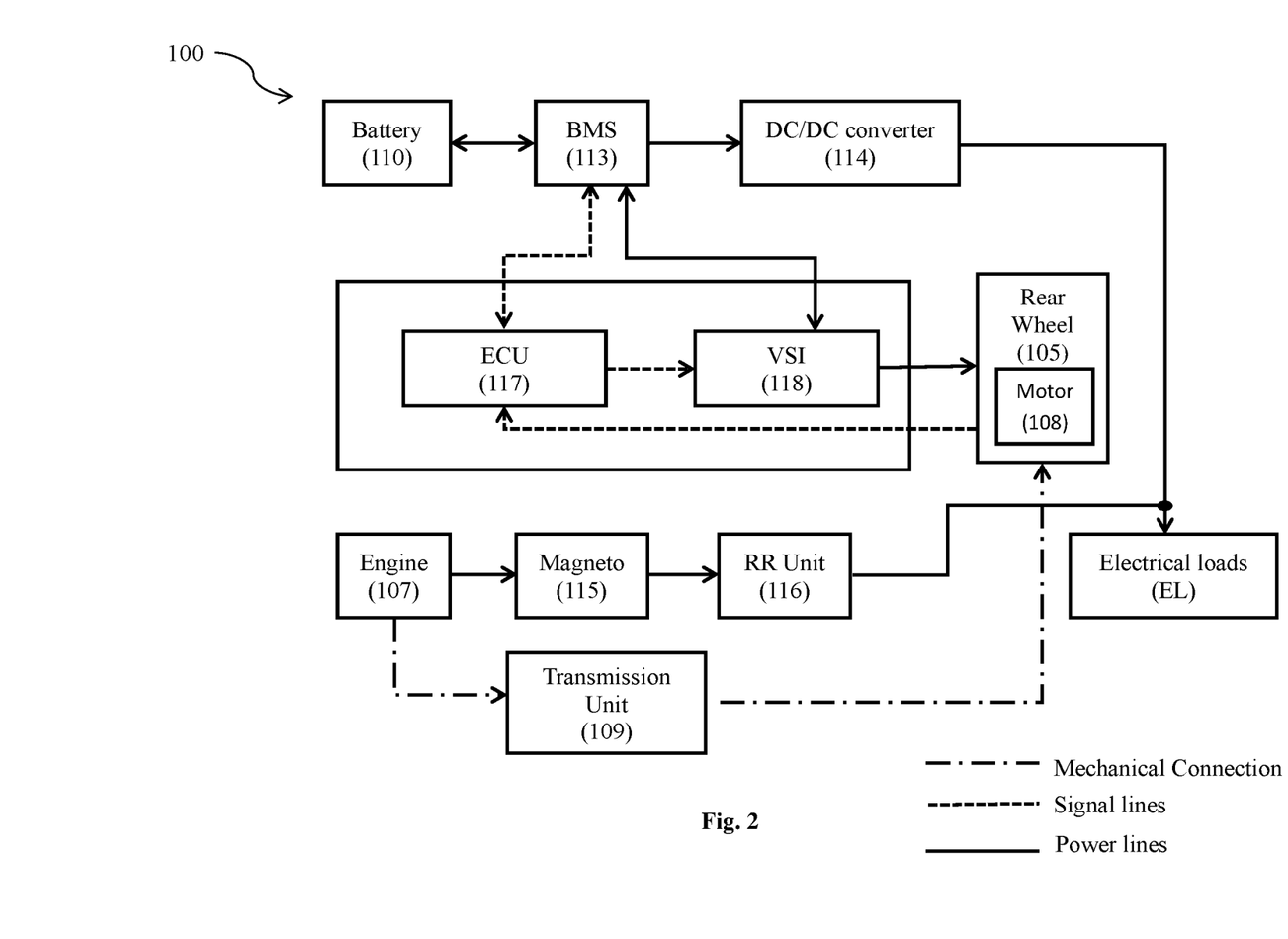
FIG. 2 illustrates a block diagram of the conventional two wheeled hybrid vehicle, depicting a propulsion system, power supply mechanism to the electrical loads, and existing battery charging mechanism, in accordance with the embodiment depicted in FIG. 1.

Referring to FIG. 2, a block diagram of the vehicle (100) is shown. FIG. 2 mainly depicts an existing propulsion system, an existing power supply mechanism to the electrical loads EL, and an existing battery charging mechanism.

The propulsion system includes multiple propulsion modes in the hybrid type of vehicle (100). Mainly the propulsion modes include engine-based propulsion and motor-based propulsion. In engine-based propulsion, the engine (107) is coupled with the transmission system (109), which is further coupled with the rear wheel (105). In motor-based propulsion, the motor (108) is coupled with the rear wheel (105). The motor (108) is generally mounted on the rear wheel (105); however, the location of the motor (108) may vary based on the vehicle packaging.

The power supply mechanism to the electrical loads EL includes a battery-based supply, and an engine-based supply. The battery-based supply includes the battery (110), a battery management system (hereinafter BMS) (113), and a DC/DC converter (114). The BMS (113) is communicatively connected to the battery (110) such that the BMS (113) controls and regulates power flowing to the battery (110) during charging and the power flowing from the battery (110) during discharging.

The DC/DC converter (114) is connected to the battery (110) through the BMS (113) to receive power flowing from the battery (110). The DC/DC converter (114) transfers the power to the electrical loads EL. The engine-based power supply includes the engine (107), a magneto (115), and a rectifier and regulator unit (hereinafter RR unit) (116). The engine (107) drives the magneto (115), which generates the electrical power. The generated electrical power is received by the RR unit (116). The RR unit (116) regulates the received electrical power and transfers it to the electrical loads EL.

The existing battery charging mechanism includes an electronic control unit (hereinafter ECU) (117), a voltage source invertor (hereinafter VSI) (118), and the BMS (113). The ECU (117) receives a RPM count or a real-time speed of the motor (108) based on that the ECU (117) directs the BMS (113) to control the battery (110) charging through the VSI (118). The VSI (118) is communicatively connected to the motor (108) and the BMS (113) to send power of the battery (110) to the motor (108) for starting the motor (108), and to receive the back electro motive force (hereinafter back e. m. f.) generated by the motor (108) to charge the battery (110).

Figure 3:
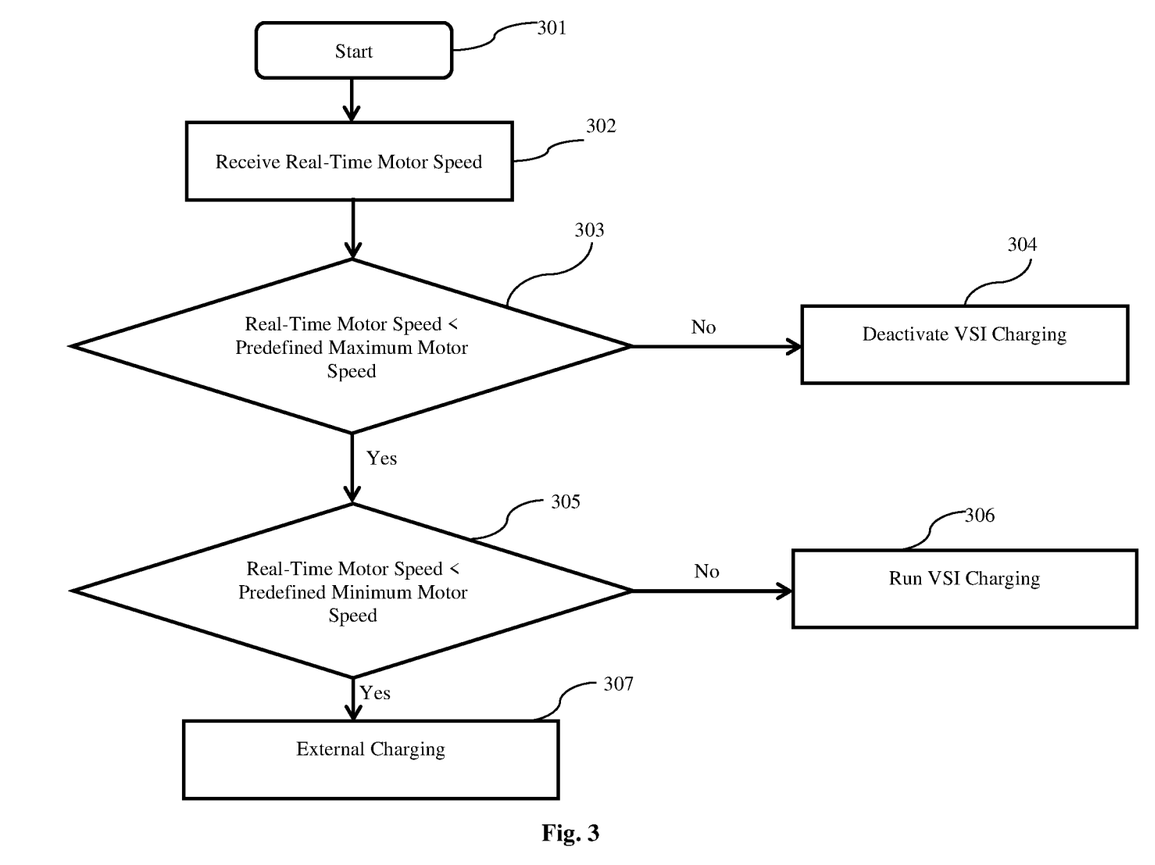
FIG. 3 depicts a flow chart describing the existing battery charging mechanism of the conventional two wheeled hybrid vehicle, in accordance with the embodiment depicted in FIG. 2.

Referring to FIG. 3 in view of FIG. 2, step 301 to step 305 of the flowchart describes the existing charging mechanism in the following description. The ECU (117) receives the RPM count depicting the real-time motor speed ($S_{RT}$), through a speed sensor (not shown). The speed sensor (not shown) may be mounted on the rear wheel (105). In different embodiments, the ECU (117) may receive RPM count using any known means. The speed sensor (not shown) and any other known means can be mounted at any location in the vehicle (100).

In the existing charging mechanism, the ECU (117) is provided with a pre-defined maximum motor speed ($S_{Max}$), below which the battery 110 can be safely charged using the back e. m. f. generated by the motor 108. The ECU 117 compares the real-time motor speed ($S_{RT}$) with the pre-defined maximum motor speed ($S_{Max}$). If the real-time motor speed ($S_{RT}$) remains less than the pre-defined maximum motor speed ($S_{Max}$) then the ECU 117 send activation signals to the BMS 113 to allow charging of the battery 110 through the VSI 118. The VSI 118 receives the back e. m. f. generated by the motor 108 and provides suitable power to the BMS 113 to charge the battery 110.

If the real-time motor speed ($S_{RT}$) reaches more than the pre-defined maximum motor speed ($S_{Max}$) then the ECU 117 directs the BMS 113 to disconnect the connection from the VSI 118 in order to safeguard the battery 110, as an uncontrollable current flow through the VSI 118 on high real-time motor speed ($S_{RT}$) due to very high back emf generated by the motor 108.

Additionally, if the real-time motor speed ($S_{RT}$) is less than a pre-defined minimum motor speed ($S_{Min}$) such as pre-idling speed or braking conditions, the back e. m. f. generated by the motor (110) is not sufficient to charge the battery (110). Thus, the battery (110) cannot be charged at motor speeds beyond the predefined maximum motor speed and at pre-idling speed or braking conditions, which may lead to deep-discharge conditions for the vehicle (100).

In addition, at deep-discharge conditions, the battery (110) cannot be charged by starting the vehicle (100) and an external charging mechanism (step 307) is required. Said external charging mechanism, which can revive a deep discharge battery, is mostly available at the service stations. Hence, the user needs to go to the service station to solve the deep discharge problem.

Figure 4:
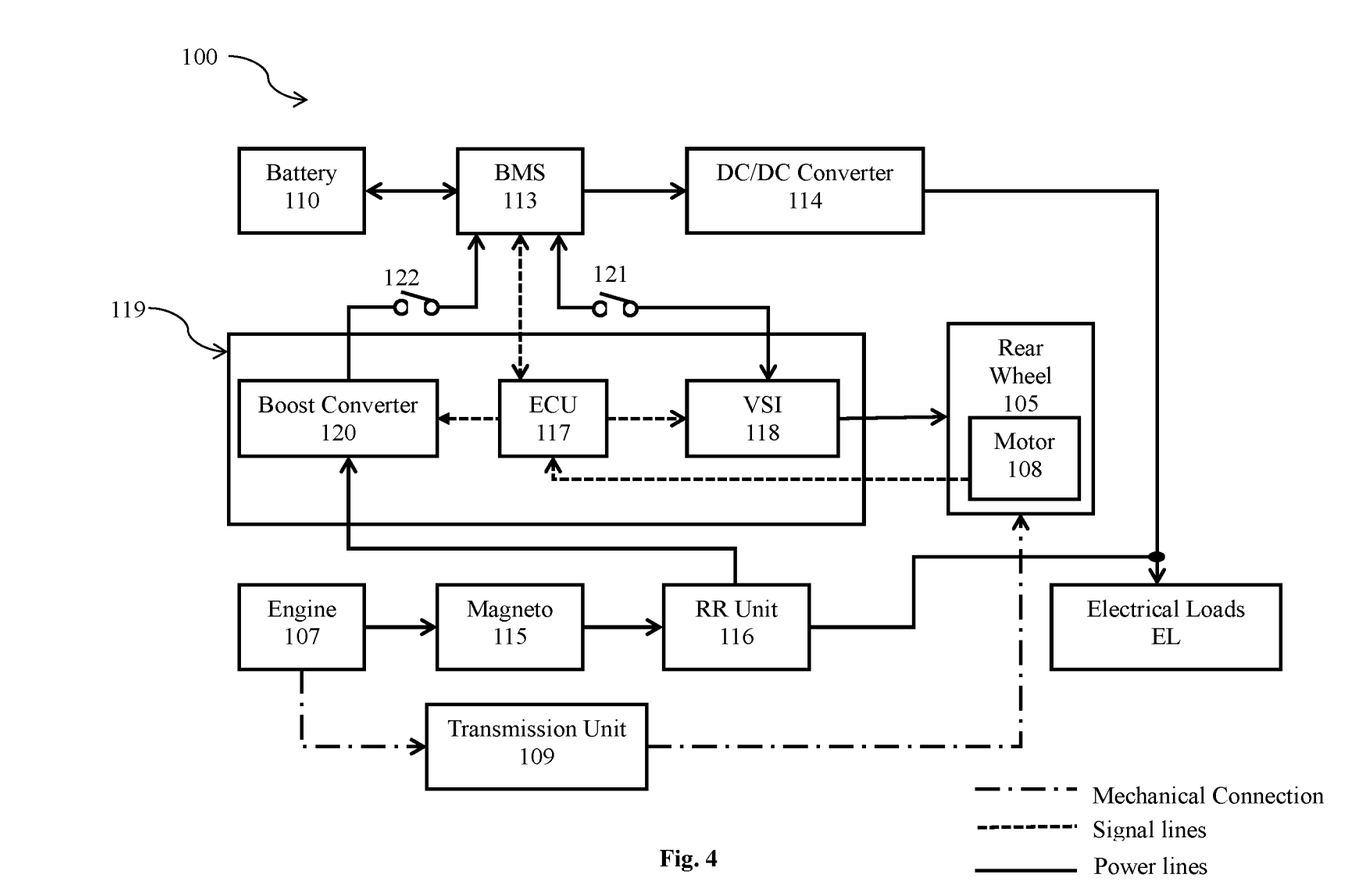
FIG. 4 illustrates a block diagram of the conventional vehicle, depicting a battery charging system describing the present subject matter, in accordance with the embodiment of FIG. 1.

The present subject matter provides a solution for the above-mentioned drawbacks. FIG. 4 provides a block diagram of the conventional vehicle (100) including the existing propulsion system, the existing power supply mechanism to the electrical loads EL, and a new battery charging system. The shown propulsion system and the power supply mechanism are explained above in the FIG. 2 description.

The battery charging system includes the battery (110), the battery management system (113), and a support unit (119). The battery (110) is communicatively connected to the battery management system (113). The battery management system (113) is communicatively connected to the support unit (119). The support unit (119) is also connected to the RR unit (116) used in the engine based power supply, such that the RR unit (116) supplies electrical power to the support unit (119) for battery charging when required. In the claimed battery charging system, the battery (110) is charged by a boost converter charging mode and a voltage source inverter (hereinafter VSI) charging mode using the support unit (119).

The support unit (119) includes the ECU (117), the VSI (118), and a boost converter (120). The ECU (117) is communicably connected to the BMS (113), the VSI (118), and the boost converter (120). The ECU (117) is provided with a predefined motor speed constant (S), and a predefined state of charge value (SoC) for the battery (110). The predefined motor speed constant (S) defines a motor speed band. The motor speed band includes a higher band value ($S_{HV}$) and a lower band value ($S_{LV}$). The higher band value ($S_{HV}$) defines a maximum speed or a top speed of the motor (108), up to which the battery (110) can be safely charged using the VSI (118) that use the back emf generated by the motor (108). The lower band value (hereinafter $S_{LV}$) defines the minimum speed or a pre-idling speed of the motor (108) only above which the motor (108) can generate a sufficient back emf so that the VSI (118) can charge the battery (110).

The predefined state of charge value (SoC) for the battery (110) includes a minimum state of charge value ($SoC_{min}$) and a maximum state of charge value ($SoC_{max}$) for the battery (110). The minimum state of charge ($SoC_{min}$) defines a required minimum charged power in the battery (110), below which the battery (110) will be in the deep discharge condition. The maximum state of charge value ($SoC_{max}$) defines a maximum charged power capacity of the battery (110) above which the battery (110) cannot be charged.

The ECU (117) of the support unit (119) generates one or more command signal for the BMS (113) to regulate modes of battery (110) charging. The ECU (117) generates the command signals based on a real-time motor speed $S_{RT}$ and a real-time state of charge of battery ($SoC_{RT}$). The command signals may include a first activation signal defining an activation command for activation of the VSI charging mode and a second activation signal defining an activation command for activation of the boost converter charging mode.

The VSI (118) of the support unit (119) is communicably connected to the ECU (117), the BMS (113) and the motor (108) to send battery (110) power to the motor (108) for starting the motor (108) and to receive the back emf generated by the motor (108 to charge the battery (110). The VSI (118) is being powered using the back emf, and transfers the power to the battery (110) based on the command signals generated by the ECU (117). The VSI (118) is connected to the BMS (113) through a first switch (121) that completes the circuit for the power flow. On receipt of the generated command signals, the BMS (113) operates the first switch (121) to control the battery-charging mode. For example, upon generation of the first activation signal the BMS (113) closes the first switch (121) to enable power flow from the VSI (118) to the battery (110) in order to enable the VSI charging mode. Additionally, upon generation of the second signal the BMS (113) opens the first switch (121) to break the circuit and to stop the power flow from the VSI (118) to the battery (110) in order to stop the uncontrollable current flowing through the VSI (118) circuit and to protect the battery (110).

The boost converter (120) of the support unit (119) is communicably connected to the ECU (117) and the BMS (113). The boost converter (120) is connected to the BMS (113) through a second switch (122). In the present embodiment, the VSI (118) and the boost converter (120) are connected to the BMS (113) through the first switch (121) and the second switch (122) respectively; however, the first switch (121) and the second switch (122) may include any other known connection means.

Additionally, the boost converter (120) is connected to the RR unit (116) to receive the power from the RR unit (116). The boost converter (120) is being powered from the RR unit (116) and transfers the received power to the BMS (113) for the battery (110) charging during the boost converter charging mode. In the event of deep discharge, the boost converter (120) is initially powered and activated by the RR unit (116). The boost converter (120) then supplies the received power to the battery (110) through the BMS (113). Upon generation of the second activation signal by the ECU (117), the BMS (113) opens the first switch (121) and disconnects the VSI charging mode. The BMS (113) then closes the second switch (122) to complete the boost converter (120) circuit in order to activate the boost converter charging mode. The power from the boost converter (120) flows to the battery (110) through the BMS (113) to charge the battery (110).

Figure 5A:
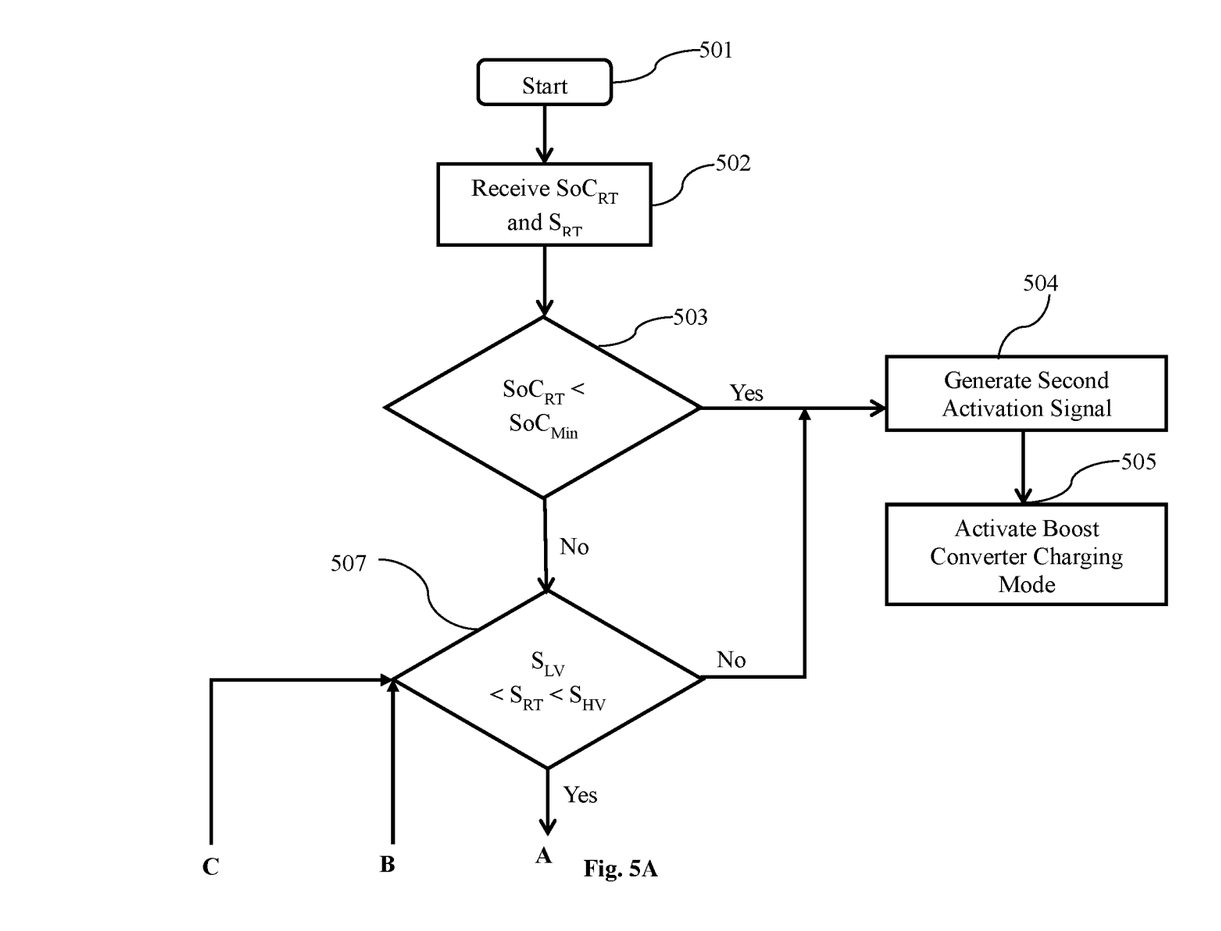
Figure 5B:
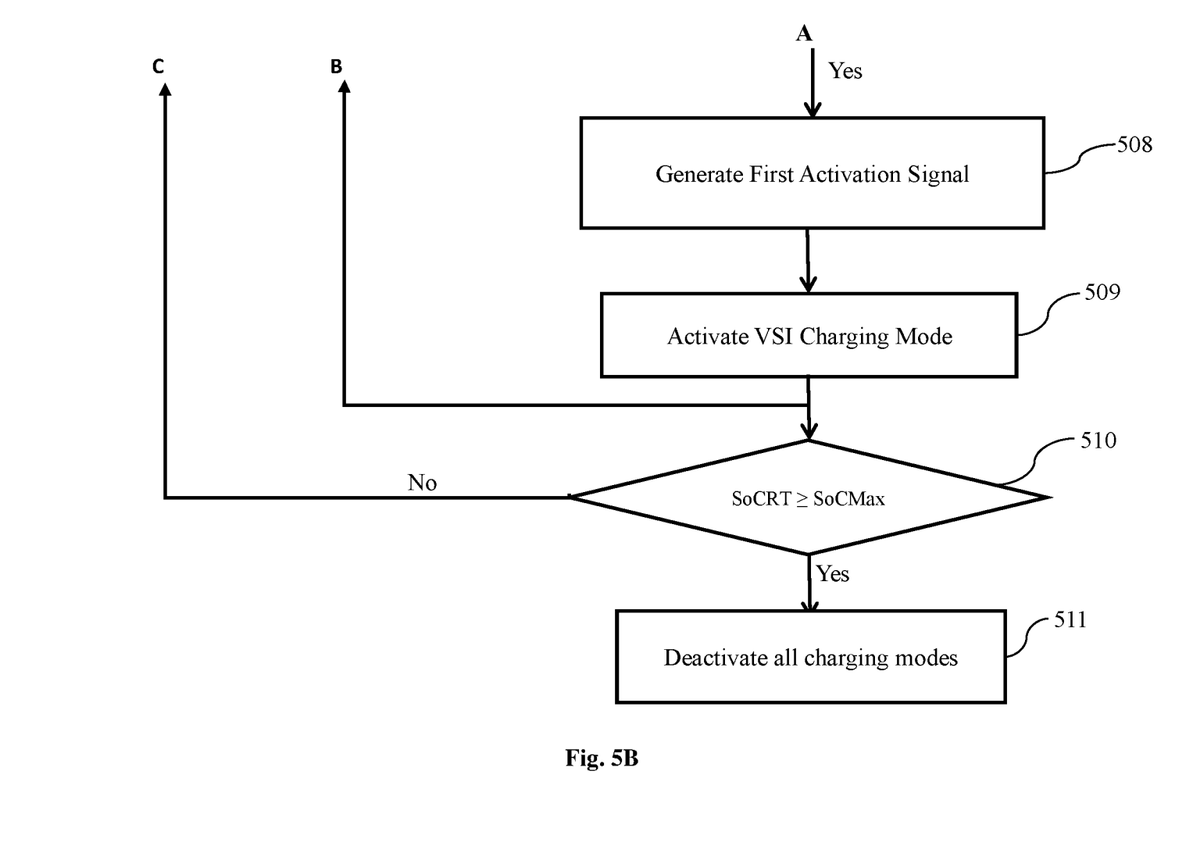

Referring to FIG. 5A and FIG. 5B in view of FIG. 4, step 501 to step 510 of the flowchart describes as follows the operational details of the battery charging system of the present subject matter. In operation, the ECU (117) receives the real-time state of charge (SoC$_{RT}$) of the battery (110) through the BMS (113). The ECU (117) also receives the real-time motor speed (S$_{RT}$) through the speed sensor (not shown) or any other known sensing means. The ECU (117) compares the real-time state of charge (SOC$_{RT}$) of the battery (110) with the predefined minimum state of charge value (SoC$_{Min}$). In an event when the real-time state of charge (SOC$_{RT}$) is less than the predefined minimum state of charge value (SoC$_{Min}$), the ECU (117) generates the second activation signal. Upon generation of the second activation signal, the BMS (113) opens the first switch (121) and closes the second switch (122) to initiate/activate the boost converter charging mode.

In another event, depicted in step 507, when the real-time state of charge (SoC$_{RT}$) is more than or equal to the predefined minimum state of charge value (SOC$_{Min}$), the ECU (117) compares the received real-time motor speed (S$_{RT}$) with the predefined motor speed constant/motor speed band (S). If the real-time motor speed (S$_{RT}$) does not exist between or exist beyond the lower band value (S$_{LV}$) and the higher band value (S$_{HV}$), the ECU (117) generates the second activation signal. Upon generation of the second activation signal, the BMS (13) initiates/activates the boost converter charging mode. Further, at step 507, in an event when the real-time motor speed (S$_{RT}$) exists between or within the lower band value (S$_{LV}$) and the higher band value (S$_{HV}$), the ECU (117) generates the first activation signal. Upon generation of the first activation signal at step 508, the BMS (113) opens the second switch (122) and closes the first switch (121) to complete the VSI (118) charging circuit, and activates/initiates the VSI charging mode.

Further, the ECU (117) again compares the real-time motor speed (S$_{RT}$) with the predefined motor speed constant/ motor speed band (S), going back to step 507 and generates the first activation signal and the second activation signal as explained above.

Additionally, as shown in step (510), the ECU (117) compares the real-time state of charge (SoC$_{RT}$) with the predefined maximum state of charge value (SoC$_{Max}$). In an event when the real-time state of charge (SoC$_{RT}$) is more than or equal to the predefined maximum state of charge value (SoC$_{Max}$), the BMS (113) deactivates all charging modes and stops the battery charging to safe guard the battery (110), after receiving command from the ECU (117). In another event, at step ??? when the real-time state of charge (SoC$_{RT}$) is less than the predefined maximum state of charge value (SoC$_{Max}$), the ECU (117) again compares the real-time motor speed (S$_{RT}$) with the predefined motor speed constant/motor speed band and generates the first activation signal and the second activation signal as explained above. The above explained process or method to charge the battery (110) continues until the vehicle (100) remains on.

Figure 6:
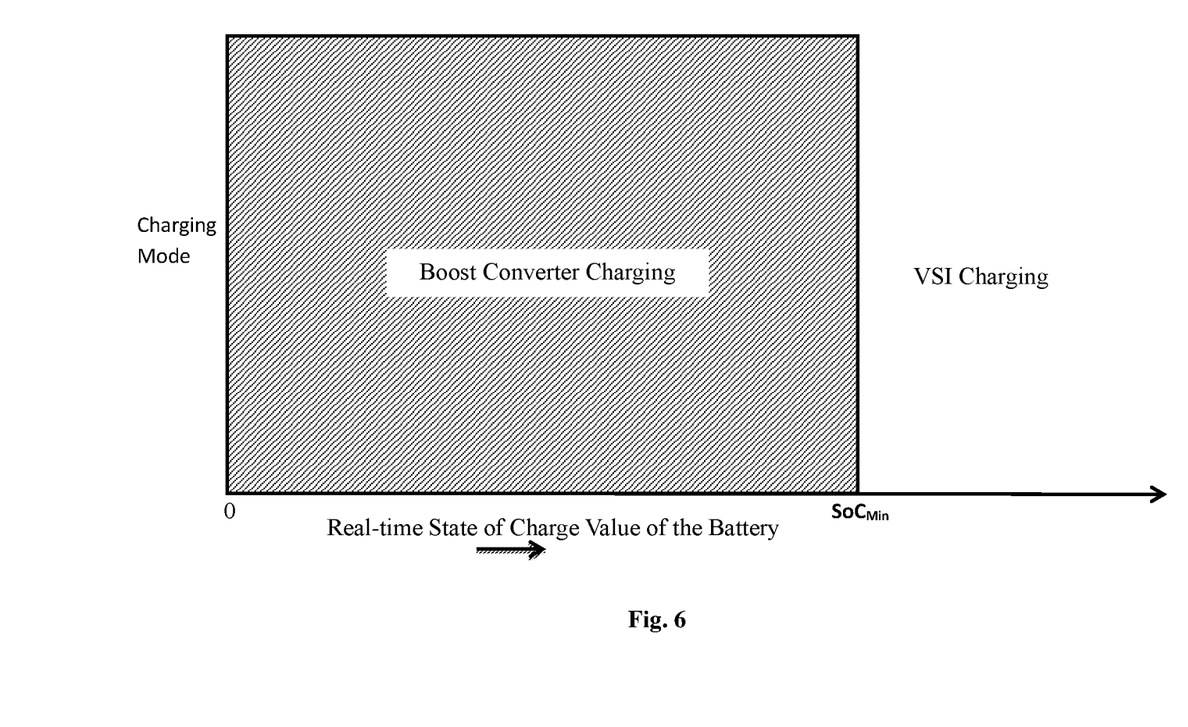
FIG. 6 depicts a graphical representation of the battery charging system based on a deep-discharge charging format describing the present subject matter, in accordance with the embodiment depicted in FIG. 4, FIG. 5A, and FIG. 5B.
Figure 7:
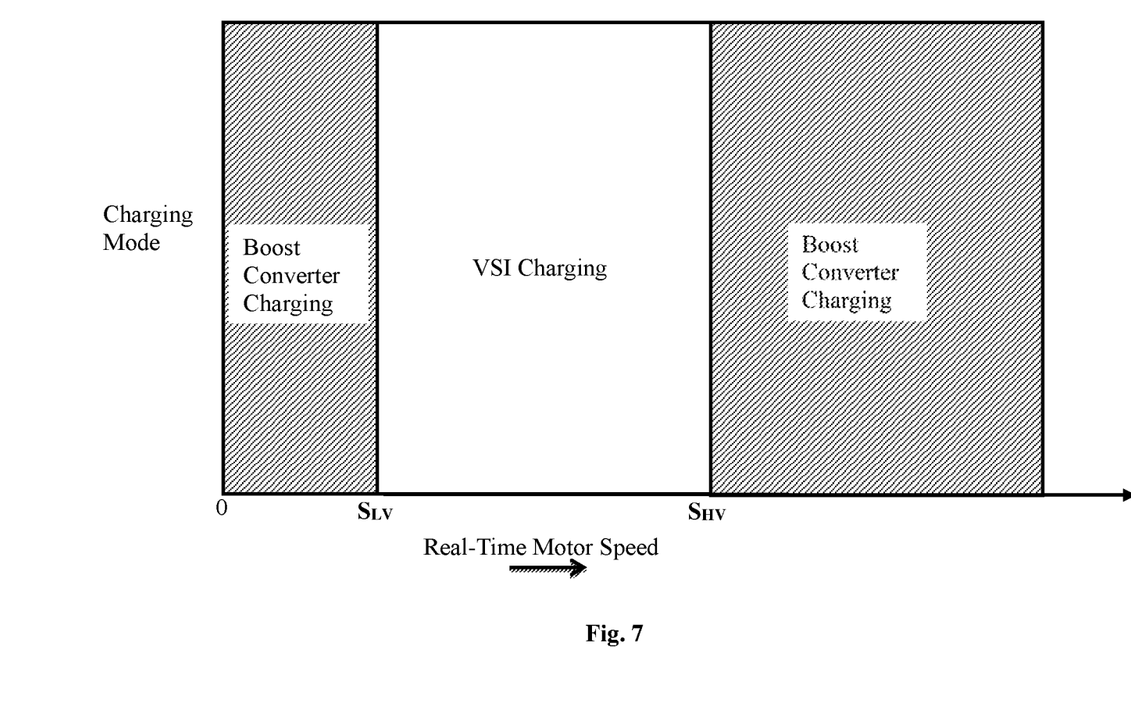
FIG. 7 depicts a graphical representation of the battery charging system based on a motor speed band format describing the present subject matter, in accordance with the embodiment depicted in FIG. 4, FIG. 5A, and FIG. 5B.

Referring to FIG. 6 and FIG. 7, in view of FIG. 5, the enablement of the boost converter charging mode and the VSI charging mode for different values of the real-time state of charge (SoC$_{RT}$) of battery (110) and the real-time motor speed (S$_{RT}$) is explained. In deep-discharge condition, once the vehicle (100) is started, the power generated by generator is supplied to the boost converter (120) through the RR unit (116) to fulfill the basic power supply to the boost converter (120). As shown in FIG. 6, the boost converter charging mode remains activated till the real-time state of charge value (SoC$_{RT}$) of the battery (110) reaches the predefined minimum state of charge value (SoC$_{Min}$) of the battery (110).

As shown in FIG. 7, once the real-time state of charge value (SoC$_{RT}$) of the battery (110) is more than the predefined minimum state of charge value (SoC$_{Min}$) of the battery (110), the boost converter charging mode remains activated if the real-time motor speed (S$_{RT}$) is less than the lower band value (S$_{LV}$). Once the real-time motor speed (S$_{RT}$) is more than the lower band value (S$_{LV}$) and remains less than the higher band value (S$_{HV}$), the VSI charging mode for the battery 110 is activated. Further, if the real-time motor speed (S$_{RT}$) is more than the higher band value (S$_{HV}$) then the VSI charging mode is deactivated and the boost converter charging mode is activated for battery (110) charging.

In an embodiment, the real-time motor speed (S$_{RT}$) may correspond to the real-time vehicle speed in any hybrid vehicle. For example, in motor-based propulsion, the real-time motor speed (S$_{RT}$) corresponds to the speed of the motor, whereas in the engine-based propulsion with a hub mounted motor configuration, the real-time motor speed (S$_{RT}$) corresponds to the speed of the vehicle (100). However, in another embodiment, where the motor (108) is mounted on the chassis of the vehicle (100), the real-time motor speed (S$_{RT}$) corresponds only to the speed of the motor (108). In addition, the aspects of the present subject matter are not limited to vehicle used herein.

It is to be understood that the aspects of the embodiments are not necessarily limited to the features described herein. Many modifications and variations of the present subject matter are possible in the light of above disclosure. Therefore, within the scope of claims of the present subject matter, the present disclosure may be practiced other than as specifically described.

We claim:

1. A battery charging system for a hybrid electric vehicle, the battery charging system comprising:
   a battery;
   a battery management system communicatively connected to the battery, the battery management system being adapted to control a power flow to and from the battery;
   a support unit connected to the battery through the battery management system, wherein the support unit is powered by the battery;
   a rectifier and regulator unit,
       wherein the rectifier and regulator unit is powered by a magneto of the hybrid electric vehicle,
       wherein the magneto is powered by an internal combustion engine of the hybrid electric vehicle; and
   a motor,
   wherein the support unit comprises:
       an electronic control unit being communicably connected to the battery management system, provided with a predefined motor speed constant and a predefined state of charge value of the battery, wherein the predefined state of charge value corresponds to a required minimum charged power in the battery below which the battery is in a deep discharge condition,
       wherein the electronic control unit receives a real-time motor speed of the hybrid electric vehicle from one or more sensing units and a real-time state of charge value of the battery from the battery management system;
       a voltage source inverter communicably connected to the electronic control unit, the battery management system, and the motor, wherein the voltage source inverter is connected to the battery management system using a first switch; and a boost converter being communicably connected to the electronic control unit, the battery management system, and the rectifier and regulator unit, wherein the boost converter is connected to the battery management system using a second switch;

wherein the electronic control unit:

determines whether the received real-time state of charge value is less than or greater than the provided predefined state of charge value, upon determining that the received real-time state of charge value is greater than the provided predefined state of charge value:

determines whether the real-time motor speed is between a lower band value defining a pre-idling speed of the hybrid electric vehicle and a higher band value defining a top speed of the motor, and upon determining that the real-time motor speed is between the lower band value and the higher band value, generates a first activation signal and activates, using the battery management system, a voltage source inverter (VSI) charging mode based on the generated first activation signal, wherein the first switch is closed and the second switch is opened in the VSI charging mode, upon determining that the received real-time state of charge value is less than the provided predefined state of charge value, generates a second activation signal and activates, using the battery management system, boost converter charging mode based on the generated second activation signal, wherein the first switch is opened and the second switch is closed in the boost converter charging mode, determines whether the received real-time state of charge value is greater than a predefined maximum state of charge value, wherein the predefined maximum state of charge value corresponds to a maximum charged power capacity of the battery above which the battery cannot be charged, and upon determining that the received real-time state of charge value is greater than the predefined maximum state of charge value, deactivates, using the battery management system, both the boost converter charging mode and the VSI charging mode.

2. The battery charging system of claim 1, wherein the predefined motor speed constant is a function of a speed of the motor and a back electromotive force voltage of the motor.

3. The battery charging system of claim 1, wherein the predefined state of charge value of the battery defines a predefined minimum state of charge value of the battery and a predefined maximum state of charge value of the battery.

4. The battery charging system of claim 1, wherein the electronic control unit generates the second activation signal upon determining that the real-time motor speed of the hybrid electric vehicle is more than the higher band value.

5. The battery charging system of claim 1, wherein the electronic control unit generates the second activation signal upon determining that the real-time motor speed of the hybrid electric vehicle is less than the lower band value.

* * * * *